United States Patent Office 3,179,632
Patented Apr. 20, 1965

3,179,632
PROCESS FOR PREPARING POLYIMIDES BY TREATING POLYAMIDE-ACIDS WITH AROMATIC MONOCARBOXYLIC ACID ANHYDRIDES
William Robert Hendrix, Williamsville, N.Y., assignor to E. I. du Pont de Nemours and Company, Wilmington, Del., a corporation of Delaware
No Drawing. Filed Jan. 26, 1962, Ser. No. 169,108
15 Claims. (Cl. 260—78)

This invention relates to novel polymeric materials and has as its primary object a novel preparation of polyimides. Other objects will appear hereinafter.

The novel group of polyimides is characterized by a recurring unit having the following structural formula:

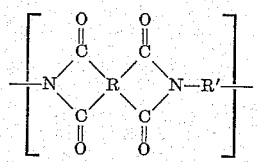

wherein R is preferably a tetravalent aromatic radical containing at least one ring of six carbon atoms, said ring characterized by benzenoid unsaturation, the four carbonyl groups being attached directly to separate carbon atoms in a benzene ring of the R radical and each pair of carbonyl groups being attached to adjacent carbon atoms in a benzene ring of the R radical; and wherein R' is a divalent organic radical of at least two carbon atoms, preferably a divalent benzenoid radical selected from the group consisting of

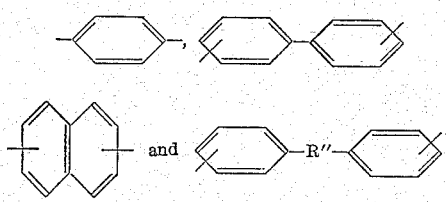

wherein R''' and R'''' are selected from the group conalkylene chain having 1–3 carbon atoms,

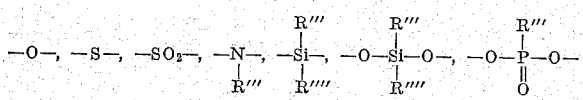

and

wherein R''' and R'''' are selected from the group consisting of alkyl and aryl.

The polyimides display outstanding physical and chemical properties which make them very useful as shaped structures such as self-supporting films, fibers, filaments and the like. The structures are characterized by high tensile properties, desirable electric properties and surprising stability to heat and water.

The polyimides are prepared by reacting at least one organic diamine having the structural formula:

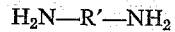

wherein R' is a divalent radical containing at least 2 carbon atoms, the two amino groups of said diamine each attached to separate carbon atoms of said divalent radical; with at least one tetracarboxylic acid dianhydride having the structural formula:

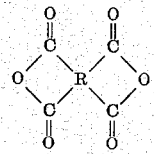

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature below 175° C. sufficient to form "n" moles of a polyamide-acid, each mole containing "m" amide-acid linkages and then converting the polyamide-acid to the polyimide by treating the polyamide-acid composition with "n" times "m" moles of an aromatic monobasic acid anhydride, preferably benzoic anhydride. Although the stichiometric equivalent, based on the polyamide-acid, of the anhydride alone is operable in the present invention, it is preferred to have some of the tertiary amine, preferably pyridine or isoquinoline, present as well. The ratio of the tertiary amine to anhydride may vary from zero to almost infinite mixtures with a 0.3–1.1 ratio being the most common range used with tertiary amines having the activity of pyridine and isoquinoline. Where the amine represents 1%–95% by volume of reaction mixture, the amine functions as a catalyst for the action of the cyclyzing agent, the anhydride.

Besides benzoic anhydride, other operable anhydrides include anhydrides of the following acids: o-, m- and p-toluic acids, m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g., hemellitic, 3,4-xylic, isoxylic and mesitylenic acids; veratric acid; trimethoxy benzoic acid; alpha- and beta-naphthoic acids; and biphenylcarboxylic (i.e., p-phenyl benzoic) acid; mixed anhydrides of the foregoing with one another and with anhydrides of aliphatic monocarboxylic acids, e.g., acetic acid, propionic acid, etc., and with anhydrides of carbonic and formic acids.

Tertiary amines having approximately the same activity as the preferred pyridine and isoquinoline may be used in the process. These include 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. As mentioned previously, these amines are generally used from 0.3 to equimolar amounts with that of the anhydride converting agent. Trimethyl amine and triethylene diamine are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

Because it is easier to form a shaped structure of the polyamide-acid composition rather than the polyimide, it is preferred to form a shaped structure of the polyamide-acid composition prior to converting the polyamide-acid to the polyimide. Hence, it is only necessary to provide a composition containing enough polyamide-acid so that it can be shaped into useful objects prior to conversion of polyamide-acid to polyimide. For this purpose, it has been found that a composition containing a polymeric component made up of at least 50% of the polyamide-acid will suffice for most combinations of diamine/dianhydride reaction products. However, for polyamide-acids prepared from some combinations of diamine and dianhydride, the polymeric components of shapable compositions may contain less than, or may have to contain more than the preferred minimum of 50%.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapable compositions. The particular temperature below 175° C. that must not be exceeded for any particular combination of diamine, dianhydride, solvent and reaction time to provide a reaction product composed of sufficient polyamide-acid to be shapable will vary but can be determined by a simple test by any person of ordinary skill in the art. However, to obtain the maximum inherent viscosity, i.e., maximum degree of polymerization, for any particular combination of diamine, dianhydride, solvent, etc. and thus produce shaped articles such as films and filaments of optimum toughness, it has been found that the temperature throughout the reaction should be maintained below 60° C., preferably below 50° C.

The degree of polymerizaion of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component. The viscous solution of the polymeric composition containing polyamide-acid in the polymeric component dissolved in the solvent may be used as such for forming shaped structures.

The shaped articles composed of a substantial amount of the polyamide-acid, usually at least 50% of the polyamide-acid, are then converted by treatment with the anhydride/tertiary amine mixtures to the respective polyimide shaped articles. It should be understood that the conversion process also applies to compositions containing at least 50% of the salt derivatives of the polyamide-acids, e.g., the triethyl ammonium salt of the polyamide-acids, instead of the polyamide-acids themselves.

It should also be understood that instead of shaping the polyamide-acid composition into the usual articles, the polyamide-acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyvinyl acetals such as polyvinyl butyral, polyurethanes, all polymeric materials in the form of sheets, fibers, foams, woven and non-woven fabrics, screening, etc.; leather sheets; etc. The polyamide-acid coatings are then converted to polyimide coatings by the process of this invention.

The presence of polyamides is evidenced by their insolubility in cold basic reagents as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates. In some cases, one can also detect isoimide linkages, i.e.

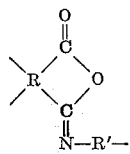

The starting materials for forming the products of the present invention are organic diamines and tetracarboxylic acid dianhydrides. The organic diamines are characterized by the formula: $H_2N-R'-NH_2$, wherein R', the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred R' groups in the diamines are those containing at least 6 carbon atoms characterized by benzenoid unsaturation. Such R' groups include

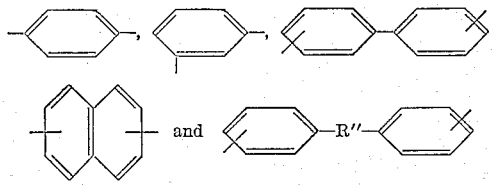

wherein R'' is selected from the group consisting of carbon in an alkylene chain having 1–3 carbon atoms, oxygen, silicon in

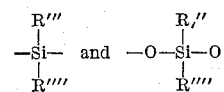

phosphorus in

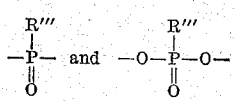

and sulphur alone or in —SO$_2$— where R‴ and R″″ are alkyl or aryl. Among the diamines which are suitable for use in the present invention are:

meta-phenylene diamine;
para-phenylene diamine;
4,4′-diamino-diphenyl propane;
4,4′-diamino-diphenyl methane;
benzidine;
4,4′-diamino-diphenyl sulfide;
4,4′-diamino-diphenyl sulfone;
3,3′-diamino-diphenyl sulfone;
4,4′-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino naphthalene;
3,3′-dimethyl-4,4′-diamino-biphenyl;
3,3′-dimethoxy benzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4′-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclo-hexane;
1,12-diamino-octadecane;
2,5-diamino-1,3,4-oxadiazole;
H$_2$N(CH$_2$)$_3$O(CH$_2$)$_2$O(CH$_2$)$_3$NH$_2$;
H$_2$N(CH$_2$)$_3$S(CH$_2$)$_3$NH$_2$;
H$_2$N(CH$_2$)$_3$N(CH$_3$)(CH$_2$)$_3$NH$_2$;
and mixtures thereof.

The tetracarboxylic acid dianhydrides are characterized by the following formula:

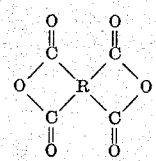

wherein R is a tetravalent organic radical selected from the group consisting of aromatic, aliphatic, cycloaliphatic, heterocyclic, combination of aromatic and aliphatic, and substituted groups thereof. However, the preferred dianhydrides are those in which the R groups have at least one ring of 6 carbon atoms characterized by benzenoid unsaturation, i.e., alternate double bonds in a ring structure, wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

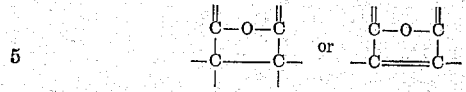

Illustrations of dianhydrides suitable for use in the present invention include:

pyromellitic dianhydride;
2,3,6,7-naphthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl) propane dianhydride;
bis(3,4-dicarboxyphenyl)sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
1,2,3,4-butane tetracarboxylic dianhydride;
thiophene-2,3,4,5-tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxyamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone, and N-acetyl-2-pyrrolidone. The solvents can be used alone in combinations of solvents, or in combination with poor solvents such as benzene, benzonitrile, dioxane, xylene, toluene and cyclohexane.

The conversion step is accomplished by treatment with sufficient aromatic acid anhydride to convert the polyamide-acid to the polyimide. If the polyamide-acid has been partially converted to polyimide prior to this step, then only enough anhydride to convert the unconverted polyamide-acid need be used. The minimum amount to provide complete conversion is the stoichiometric equivalent of the polyamide-acid present, i.e., "$n$"×"$m$" moles of anhyride to convert "$n$" moles of polyamide-acid, each mole containing "$m$" amide-acid linkages. Ordinarily, a large excess of anhydride is used in the presence of a diluent.

The most useful diluent in the conversion step is a tertiary amine, e.g., the previously mentioned pyridine. However, other diluents may also be used with or without the tertiary amine. The list includes benzene, cyclohexane, chloroform, carbon tetrachloride, acetonitrile, benzonitrile, quinoline, dimethylaniline, dimethylcyanamide, tetramethylene sulfone and ethyl acetate. Primarily, the diluents promote better diffusion of the anhydride through the polyamide-acid structure.

In one possible conversion process, a film layer of the viscous, unconverted polyamide-acid solution may be passed into a chemical conversion bath. As the conversion reagents diffuse into the layer of polyamide-acid, the polyimide rapidly gels out of solution as a clear film still swollen with considerable solvent. Solvent removal and completion of conversion of this gel film may now be effected by heating.

In another procedure, a layer of polyamide-acid solution (generally 5–20% solids in dimethylformamide or dimethylacetamide) may be cast on a glass plate or a belt of an inert material, e.g., polyethylene terephthalate film, and passed into a bath consisting of equal volumes of benzoic anhydride and pyridine at room temperature or above. The liquid film of polyamide-acid rapidly gels and becomes insolubilized to a clear, tough polyamide film which separates from the glass or polyethylene terephthalate film support. It may then be leached in such liquids as cyclohexane, dioxane, or benzoic anhydride/pyridine/benzene (10/10/80). This gel film is usually swollen with large amounts of solvent. Removal of solvent and completion of conversion may also be effected by gradually heating the gel films under restraint to temperatures of 300° C. or above.

Since conversion usually occurs very slowly if the polyamide-acid solution is contacted with only one of the conversion reagents, the process may be varied so that one of the liquids in the conversion bath (either the benzoic anhydride or the pyridine) can be present in the casting dope of polyamide-acid. This solution can then be cast into a solution of the other reagent at room temperature or above.

The above processes offer the advantages of permitting the rapid preparation of a polyimide film directly from solutions of the polyamide-acids without first drying a polyamide-acid film. These processes also avoid degradation which may occur if the polyamide-acid films had to be dried prior to conversion. Lastly, these processes also avoid degradation which may occur if the polyamide-acid films had to be dried prior to conversion. Lately, these processes permit the preparation of thick (10–12 mils) polyimide films.

Another possible conversion process involves the partial pre-conversion of polyamide-acid solution and its formation into poly(amide-acid/imide) film while still plastic and solvent-swollen. The conversion may then be completed in film form either chemically, thermally or by a combination of these methods.

In another procedure, a quantity of benzoic anhydride, at least stoichiometric with the water to be removed for conversion to polyimide, is added to a polyamide-acid solution in dimethylacetamide. Controlled dehydration necessitates using the acid acceptor tertiary amine catalyst, e.g., pyridine. The rate and extent of conversion are regulated by the temperature and the quantity of pyridine added. One then adds 10–50% of the quantity of pyridine required to neutralize the benzoic acid derived from the acetic anhydride. The solution consisting of poly(amide-acid/imide), benzoic anhydride, benzoic acid and pyridine (i.e., pyridinium acetate) in dimethylacetamide undergoes essentially no change of viscosity for a period of 10 to 30 minutes at room temperature. Hence, it can be formed into a shaped article, e.g., extruded in the form of a film through a conventional extruder. After being shaped, the material can be completely insolubilized rapidly to intractable polyimide film by raising the temperature to about 300° C. for 10–100 seconds. This process is not dependent on diffusing the desiccant through the polyamide-acid shaped article. Furthermore, chemical changes which tend to cause shrinkage are largely accomplished before the article is formed.

In still another possible process, the solution of the polyamide-acid is jet mixed with a suitable conversion liquid and is, thereafter, formed into a shaped article such as a film by conventional means. The time elapsed from contact of polyamide-acid with conversion liquid to the formation of a self-supporting film consisting mainly of polyimide can be drastically reduced to less than 30 seconds at room temperature by this process.

The invention will be more clearly understood by referring to the examples which follow. These examples, which illustrate specific embodiments of the present invention, should not be construed to limit the invention in any way.

The preparation of some of the important ingredients used in the examples are given below:

The pyromellitic dianhydride used was obtained as white crystals by sublimation of the commercial product through silica gel at 220–240° C. and 0.25–1 mm. mercury pressure.

N,N-dimethylacetamide was prepared by fractional distillation from phosphorous pentoxide; the fraction distilling at 73° C. and 30 mm. pressure being N,N-dimethylacetamide.

EXAMPLE 1

In a nitrogen atmosphere, 4.0000 grams (0.0199 mole) of 4,4'-diamino diphenyl ether and 4.3400 grams (0.0199 mole) of pyromellitic dianhydride were placed in a 250 milliliter flask equipped with mechanical stirrer. 47.2 grams of N,N-dimethylacetamide was added with stirring as the mixture was maintained under a nitrogen atmosphere. The reaction was conducted at room temperature (23° C.) and stirring was continued for three hours. N,N-dimethylacetamide was added to the viscous solution to give a 15% by weight polyamide-acid solution.

To a portion of the solution containing 0.01 mole of the polyamide-acid was added at room temperature 0.03 mole of benzoic anhydride and 0.01 mole of isoquinoline. After thorough mixing, the reaction mixture was doctored with a 30 mil knife onto a glass plate at 30° C. This gel film was maintained at 30° C. for 60 minutes. A strong, highly swollen gel film of polyimide resulted. After drying for one hour at 300° C. under restraint on a frame, the film was stiff, tough and strong.

EXAMPLES 2–8

As additional examples of the process of this invention, the polyamide-acids of pyromellitic dianhydride and 4,4'-diamino-diphenyl methane may be used and then a 15% solution in N,N-dimethylacetamide may be used for converting the polyamide-acid to the corresponding polyimide by adding 1 molar equivalent (based on the amide-acid) of isoquinoline or pyridine and 3 molar equivalents (based on the amide-acid) of the anhydride shown in the following table.

Table 1

| Example | Anhydride |
|---|---|
| 2 | O-toluic. |
| 3 | P-isopropylbenzoic. |
| 4 | P-chlorobenzoic. |
| 5 | Mesitylenic. |
| 6 | Veratric. |
| 7 | Beta-naphthoic. |
| 8 | P-phenyl benzoic. |

What is claimed is:

1. In a process for preparing polyimides wherein at least one diamine having the structural formula:

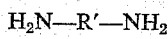

R' being a divalent radical containing at least five carbon atoms and the two amino groups of said diamine each being attached to separate carbon atoms of said divalent radical, is reacted with at least one tetracarboxylic acid dianhydride having the structural formula:

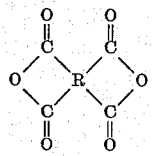

wherein R is a tetravalent radical containing at least two carbon atoms, no more than two carbonyl groups of said dianhydride attached to any one carbon atom of said tetravalent radical; in an organic solvent for at least one reactant for a time sufficient and at a temperature below 175° C. sufficient to form a polyamide-acid intermediate soluble in said solvent and said polyamide-acid intermediate is converted to an insoluble solid polyimide, the improvement wherein said polyamide-acid intermediate is treated with an aromatic monocarboxylic acid anhydride to form said insoluble solid polyimide.

2. In a process for preparing polyimides wherein at least one diamine having the structural formula:

R' being a divalent organic radical containing at least five carbon atoms and the amino groups of said diamine each being attached to separate carbon atoms of said divalent radical, is reacted with at least one aromatic tetracarboxylic acid dianhydride, all four carbonyl groups of said dianhydride being directly attached to an aromatic ring of said dianhydride, in an organic solvent for at least one reactant for a time sufficient and at a temperature below 175° C. sufficient to form a polyamide-acid intermediate soluble in said solvent and said polyamide-acid intermediate is converted to an insoluble solid polyimide, the improvement wherein said polyamide-acid intermediate is treated with an aromatic monocarboxylic acid anhydride to form said insoluble solid polyimide.

3. An improvement as in claim 2 wherein said polyamide-acid intermediate is formed into a shaped structure before being treated with said aromatic monocarboxylic acid anhydride.

4. An improvement as in claim 2 wherein said polyamide-acid intermediate is formed into a self-supporting film before being treated with said aromatic monocarboxylic acid anhydride.

5. An improvement as in claim 2 wherein said polyamide-acid intermediate is formed into a filament before being treated with said aromatic monocarboxylic acid anhydride.

6. An improvement as in claim 2 wherein said diamine is selected from the group consisting of meta-phenylenediamine, para-phenylenediamine, benzidine, 4,4'-diamino-diphenyl propane, 4,4'-diamino-diphenyl methane, 4,4'-diamino-diphenyl ether, 4,4'-diamino-diphenyl sulfone, 4,4'-diamino-diphenyl sulfide, hexamethylenediamine and 4,4'-dimethylheptamethylenediamine.

7. An improvement as in claim 2 wherein said diamine is an aromatic diamine.

8. An improvement as in claim 2 wherein said diamine is 4,4'-diamino-diphenyl ether and said dianhydride is pyromellitic dianhydride.

9. An improvement as in claim 2 wherein said dianhydride is selected from the group consisting of pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride.

10. A process for preparing polyimides which comprises treating a polyamide-acid having the recurring unit of the formula

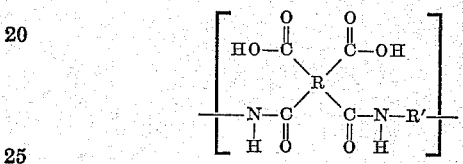

wherein
R' is a divalent organic radical containing at least five carbon atoms, and
R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical, said polyamide-acid being soluble in a solvent, with an aromatic monocarboxylic acid anhydride to form a solid polyimide having the recurring unit of the formula

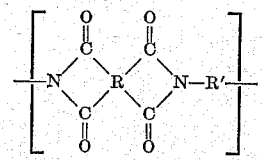

said polyimide being insoluble in said solvent.

11. A process as in claim 10 wherein said solvent is selected from the group consisting of N,N-dimethylformamide; N,N-dimethylacetamide; N,N-diethylformamide; N,N-diethylacetamide; N,N-dimethylmethoxy acetamide; pyridine and N-methyl caprolactam.

12. A process as in claim 10 wherein said aromatic monocarboxylic acid anhydride is benzoic anhydride.

13. A process as in claim 10 wherein said polyamide-acid is treated with an aromatic monocarboxylic acid anhydride and a tertiary amine.

14. A process as in claim 10 wherein said polyamide-acid is treated wtih benzoic anhydride and isoquinoline.

15. A process as in claim 10 wherein said polyimide is heated to a temperature of 300° C.–500° C. for at least 15 seconds.

References Cited by the Examiner
UNITED STATES PATENTS

| 2,710,853 | 6/55 | Edwards et al. | 260—78 |
| 2,712,543 | 7/55 | Gresham et al. | 260—78 |
| 2,731,447 | 1/56 | Gresham et al. | 260—78 |
| 2,880,230 | 3/59 | Edwards et al. | 260—78 |
| 2,900,369 | 8/59 | Edwards et al. | 260—78 |
| 3,037,966 | 6/62 | Chow et al. | 260—78 |
| 3,049,518 | 8/62 | Stephens | 260—78 |

WILLIAM H. SHORT, *Primary Examiner.*

LOUISE P. QUAST, *Examiner.*